United States Patent
Wong et al.

(10) Patent No.: US 9,317,713 B2
(45) Date of Patent: Apr. 19, 2016

(54) OBSTRUCTING USER CONTENT BASED ON LOCATION

(75) Inventors: Glenn A Wong, Foster City, CA (US); April Slayden Mitchell, San Jose, CA (US); Mark C Solomon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/112,319

(22) PCT Filed: Apr. 19, 2011

(86) PCT No.: PCT/US2011/000704
§ 371 (c)(1),
(2), (4) Date: Oct. 17, 2013

(87) PCT Pub. No.: WO2012/144970
PCT Pub. Date: Oct. 26, 2012

(65) Prior Publication Data
US 2014/0041042 A1    Feb. 6, 2014

(51) Int. Cl.
*G06F 21/60* (2013.01)
*G06F 21/62* (2013.01)
*H04M 1/725* (2006.01)
*G06F 9/44* (2006.01)

(52) U.S. Cl.
CPC ............ *G06F 21/6245* (2013.01); *G06F 21/60* (2013.01); *H04M 1/72519* (2013.01); *G06F 9/4443* (2013.01); *H04M 1/72572* (2013.01); *H04M 2250/12* (2013.01)

(58) Field of Classification Search
None
See application file for complete search history.

(56) References Cited

U.S. PATENT DOCUMENTS

| 2006/0044290 | A1 | 3/2006 | Hurwitz et al. |
| 2006/0073891 | A1 | 4/2006 | Holt |
| 2006/0210167 | A1* | 9/2006 | Inoue et al. .................. 382/190 |
| 2006/0294599 | A1 | 12/2006 | Sim et al. |
| 2007/0150827 | A1* | 6/2007 | Singh et al. .................. 715/773 |
| 2008/0088935 | A1 | 4/2008 | Daly |
| 2009/0141895 | A1* | 6/2009 | Anderson et al. ............ 380/252 |
| 2009/0307601 | A1* | 12/2009 | Kumhyr et al. ............... 715/741 |
| 2010/0111370 | A1* | 5/2010 | Black et al. .................. 382/111 |
| 2010/0115610 | A1* | 5/2010 | Tredoux et al. ................ 726/19 |

(Continued)

FOREIGN PATENT DOCUMENTS

| CN | 1761984 | 4/2006 |
| CN | 101052444 | 10/2007 |
| CN | 101165770 | 4/2008 |

(Continued)

OTHER PUBLICATIONS

Chen; "Oculis Labs Uses Eye Tracking to Blur, Obscure Screen for Massive Privacy", < http://gizmodo.com/5303158/oculis-labs-uses-eye-tracking-to-blur-obscure-screen-for-massive-privacy >, Jun. 26, 2009.

(Continued)

*Primary Examiner* — Jung Kim
*Assistant Examiner* — Adrian Stoica
(74) *Attorney, Agent, or Firm* — HP Patent Department

(57) ABSTRACT

Example embodiments disclosed herein relate to displaying private user content (420) of a first user (430) on a large interactive display (410) of a multi-user interface. The visibility of the private user content is obstructed based on identifying a second user (440).

14 Claims, 5 Drawing Sheets

(56) References Cited

U.S. PATENT DOCUMENTS

2010/0205667 A1* 8/2010 Anderson et al. ............... 726/19
2011/0231310 A1* 9/2011 Roberts et al. ................. 705/40

FOREIGN PATENT DOCUMENTS

| CN | 101809581 | 8/2010 |
| TW | I302680 B | 11/2008 |
| TW | 200919255 A | 5/2009 |
| TW | I324313 B | 5/2010 |

OTHER PUBLICATIONS

International Search Report and Written Opinion received in related PCT Application No. PCT/US2011/000704, mailed Oct. 27, 2011, 6 pgs.

* cited by examiner

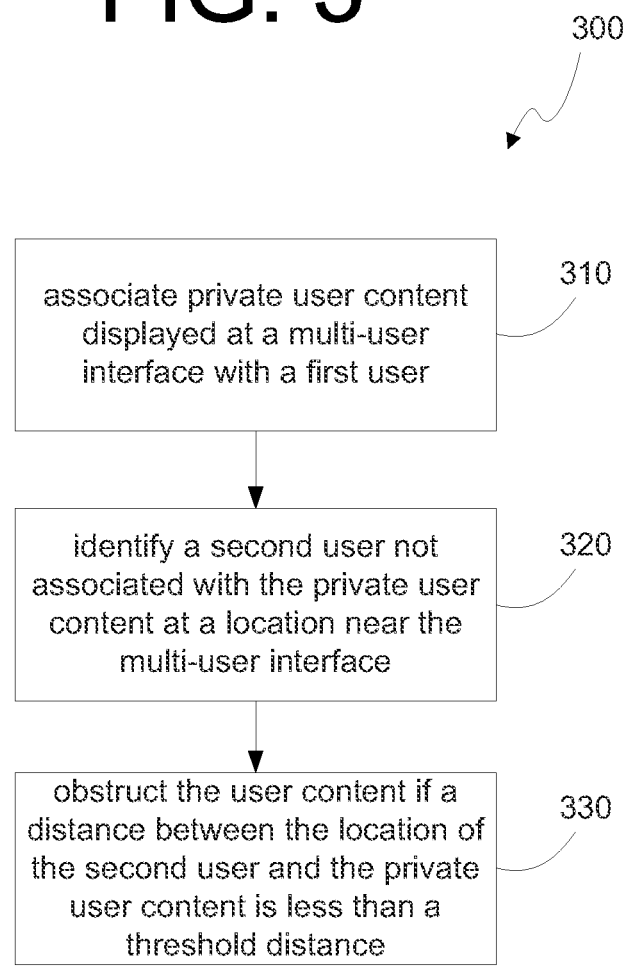

OBSTRUCTING USER CONTENT BASED ON LOCATION

BACKGROUND

Large interactive displays may be used or viewable by a plurality of users simultaneously. A large interactive display can include one or more displays or presentation devices such as a monitor or multiple monitors. Due to their size, large interactive displays are well-suited for interacting with multiple users. Device manufacturers of such large interactive displays are challenged to accommodate use of the large interactive displays by multiple users simultaneously.

BRIEF DESCRIPTION OF THE DRAWINGS

The following detailed description references the drawings, wherein:

FIG. 3 is an example flowchart of a method for obstructing private user content;

DETAILED DESCRIPTION

Specific details are given in the following description to provide a thorough understanding of embodiments. However, it wifi be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Multi-user interfaces can be utilized to provide information to users as well as to generate information. In certain embodiments, a multi-user interface is a mechanism to provide interactive content to multiple users. For example, one user can utilize the user interface or many users can utilize the user interface concurrently. An example of a multi-user interface includes a large interactive device (LID). A LID can include a large interactive display and can be a device or system including multiple devices that allows for user input to be received from multiple users and content to be presented simultaneously to multiple users. In certain embodiments, a large interactive display is a display large enough to allow multiple users to interact with it at the same time. Further, in certain embodiments, large interactive displays have large display surfaces, which can be a single large display, a number of tiled smaller displays, or the like. Large interactive displays can include interactive projection displays (e.g., a display to a projection screen or wall), liquid crystal displays (LCDs), etc. Examples of ways to interact with a multi-user interface are via a touch mechanism, such as pointing via a finger, a pen or stylus mechanism, multi-touch enabled input, an audible input mechanism (e.g., voice), and a gesture mechanism.

Multi-user interfaces can be utilized in collaborations to generate or view content by users. Some users may seek to keep certain content private, so that other users cannot see the content. However, a first user viewing the private user content may not notice the presence of a second user nearby that is, for example, not associated with the private content. Therefore, the second user may be able to view the first user's private content before the first user is able to hide the private user content from the second user. Accordingly, various embodiments disclosed herein relate to recognizing when the second user is within a threshold distance of the private user content and obstructing visibility of the private user content from the second user.

Figure 1:
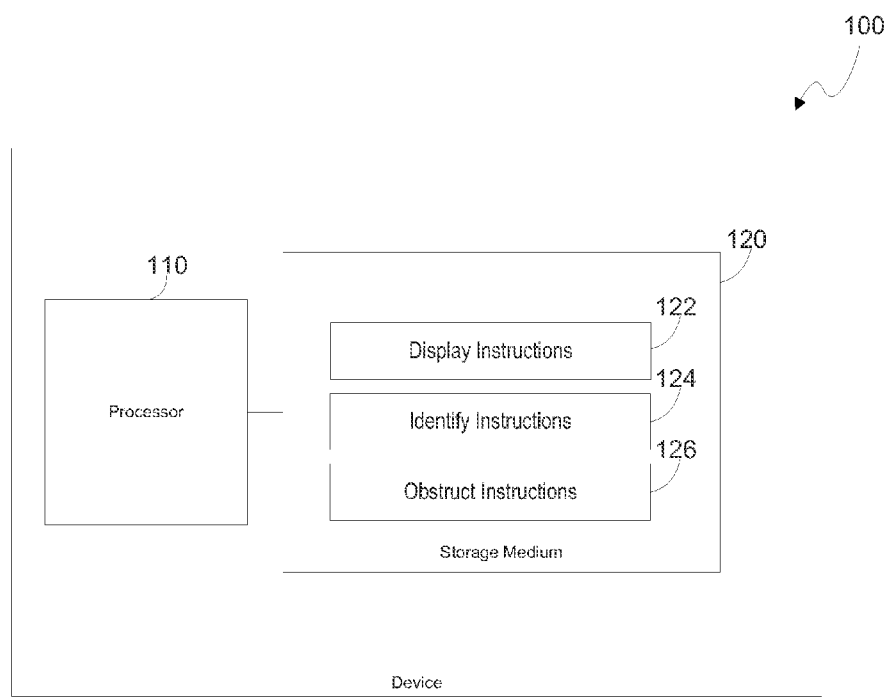
FIG. 1 is an example block diagram of a computing device including instructions for obstructing private user content.

Referring now to the drawings, FIG. 1 is an example block diagram of a computing device 100 including instructions for obstructing private user content. In the embodiment of FIG. 1, the computing device 100 includes a processor 110, and a machine-readable storage medium 120 including instructions 122, 124, 126 for obstructing the private user content of the first user from the second user. The computing device 100 may be, for example, a chip set, a notebook computer, a slate computing device, a portable reading device, a wireless email device, a mobile phone, or any other device capable of executing the instructions 122, 124, 126. In certain examples, the computing device 100 may be connected to additional devices such as sensors, displays, etc. to implement the process of FIG. 3.

The processor 110 may be, at least one central processing unit (CPU), at least one semiconductor-based microprocessor, at least one graphics processing unit (GPU), other hardware devices suitable for retrieval and execution of instructions stored in machine-readable storage medium 120, or combinations thereof. For example, the processor 110 may include multiple cores on a chip, include multiple cores across multiple chips, multiple cores across multiple devices (e.g., if the computing device 100 includes multiple node devices), or combinations thereof. The processor 110 may fetch, decode, and execute instructions 122, 124, 126 to implement obstruction of the private user content of the first user from the second user. As an alternative or in addition to retrieving and executing instructions, the processor 110 may include at least one integrated circuit (IC), other control logic, other electronic circuits, or combinations thereof that include a number of electronic components for performing the functionality of instructions 122, 124, 126.

The machine-readable storage medium 120 may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 120 can be non-transitory. As described in detail below, machine-readable storage medium 120 may be encoded with a series of executable instructions for obstructing the user content of the first user based on identifying and/or locating the second user.

Moreover, the instructions 122, 124, 126, when executed by a processor (e.g., via one processing element or multiple processing elements of the processor) can cause the processor to perform processes, for example, the process of FIG. 3. For example, display instructions 122 can be utilized to cause the processor 110 to display the private user content to the multi-user interface, such as the LID, LCD, a projector, etc. The identify instructions 124 may be executed by the processor 110 to identify one or more users, such as the second user, who may not be associated with the private user content. The obstruct instructions 126 may be executed by the processor 110 to obstruct visibility of the private user content, for example, by blurring the private user content viewable at the multi-user interactive interface. The term user may refer to any person within a threshold distance of the multi-user interface and the term private user content may refer to any content that should not be viewable by all of the users.

The machine-readable storage medium 120 may also include collect instructions (not shown) to collect location data of at least one of the first and second users. For example, the collect instructions may be used by the processor 110 to collect via an input and/or to interpret the location data.

Examples of the location data may include data related to first and/or second user's position in front of a reference point, distance from the reference point, orientation in front of the reference point, and the like. The reference point may be a sensor, the multi-user interface such as the LID, the private user content being displayed, and the like. The orientation may be determined based on an identification of features of the first and/or second user (e.g., facial information, voice detection, etc.). Moreover, orientation can be in relation to one or more reference points (e.g., sensor locations) or a reference face (e.g., a display side of the multi-user interface). For example, the second user's position and orientation may be correlated with the reference point or face of the multi-user interface to determine where on the multi-user interface the user is looking.

Moreover, the location data may also include data related to face recognition, voice recognition, body shape, weight, gait, hand geometry, iris recognition, scent data, and the like, for at least one of the first and second users. Also, in embodiments, the collect instructions may also include instructions to collect and/or interpret other types of data relating to identifying, differentiating, and/or determining the position of the first and/or second users. While embodiments describe the first and second users, embodiment are not limited thereto and may include more than two types of users.

The location data may be collected by sensory inputs (not shown) interfacing with the processor 110, such as, a camera sensor, an audio sensor, an infrared sensor, a proximity sensor, a weight sensor, an olfactory sensor and the like. The processor 110 may receive the location data from the sensory inputs. The location data may be then stored and/or interpreted based on the instructions executed by the processor 110.

For example, the camera sensor may be used for face, height, body shape, orientation or gait recognition. The proximity sensor may be used to determine a position of the first or second user in front of the multi-user interface. The audio sensor may be used to determine the first or second user's position based on voice recognition and/or a volume level of the first or second user's voice. The location data from the one or more sensors may also be used singly or in combination to determine the position of first or second user in two or three dimensions.

The identify instructions 124 may be executed by the processor 110 to identify the second user, for example based on the location data of the second user. In addition, the identify instructions 124 may be executed by the processor 110 to identify the first user according to username or password authentication by the first user and/or the location data of the first or second user. For example, location data collected from the camera sensor may be used to locate the position of multiple users. Further, the collected location data may be used to differentiate the identity of the multiple users, where some of the collected location data may be compared to previously stored location data related to face recognition of the first user. If the collected location data matches the stored location data, the first user may be identified. Otherwise, the second user may be identified if the measured and stored location data do not match. In addition, the second user may be implicitly identified, such as when a single first user is associated with the private user content and the first user is already present. Similar comparisons may be also be made with other types of location data, such as audio data, to identify and/or locate the first or second user.

Information may be classified as private user content based on a type of information included in the private user content and/or a command by the first user. For example, certain types of information may be automatically classified as private user content, such as personal information like a social security number. Other types of information may be classified or declassified as private user content according to a manual input by the first user, such as by modifying permissions of a document. In addition, information created or modified by the first user when interacting with multi-user interface, such as when creating work product, may be automatically classified as private user content. The first user may enter the manual inputs or create or modify the private user content via an input device (not shown) such as a sensor, a keyboard, a mouse, a remote, a keypad, or the like. The sensor may include various types of technologies, such as infrared technology, touch screen technology, etc.

The obstruct instructions 126 may be executed by the processor 110 to obstruct visibility of the private user content displayed on the multi-user interface, such as the LID. The private user content may be obstructed by, blurring, removing, and converting the private user content, and the like. The converting may include, for example changing a language, orientation, size, or placement of the private user content. The obstruct instructions 126 to obstruct visibility of the private user content may be communicated via the processor 110 to the display instructions 122 or the multi-user interface when the location of the second user from the reference point is less than the threshold distance, as explained in greater detail below.

The machine-readable storage medium 120 may also include distance instructions (not shown) to determine the threshold distance to obstruct the private user content. The threshold distance may be determined experimentally or based on a manufacturer's or user's specifications. For example, the distance instructions may be used by the processor 110 to determine when to obstruct visibility of the private user content based on a text size, font or type of the private user content, or the location information, such as a vector of the second user. The vector may include at least one of a current speed and direction of movement of the second user. For instance, a smaller text size may be harder to read than a larger text size, and thus have a smaller value for the threshold distance. Further, if the second user is moving at a faster speed towards the private user content, the threshold distance may have a larger value. Therefore, the threshold distance may vary according to one or more parameters of the private user content or the location data.

In addition, the private user content may be classified according to different levels of privacy based on a type of content, where the private user content having a higher level of privacy is obstructed at an earlier time or threshold distance having a larger value than the private user content having a lower level of privacy. The private user content may include images, text (e.g., based on one or more fonts), windows, menus, icons, controls, widgets, tabs, cursors, pointers, etc.

Figure 2:
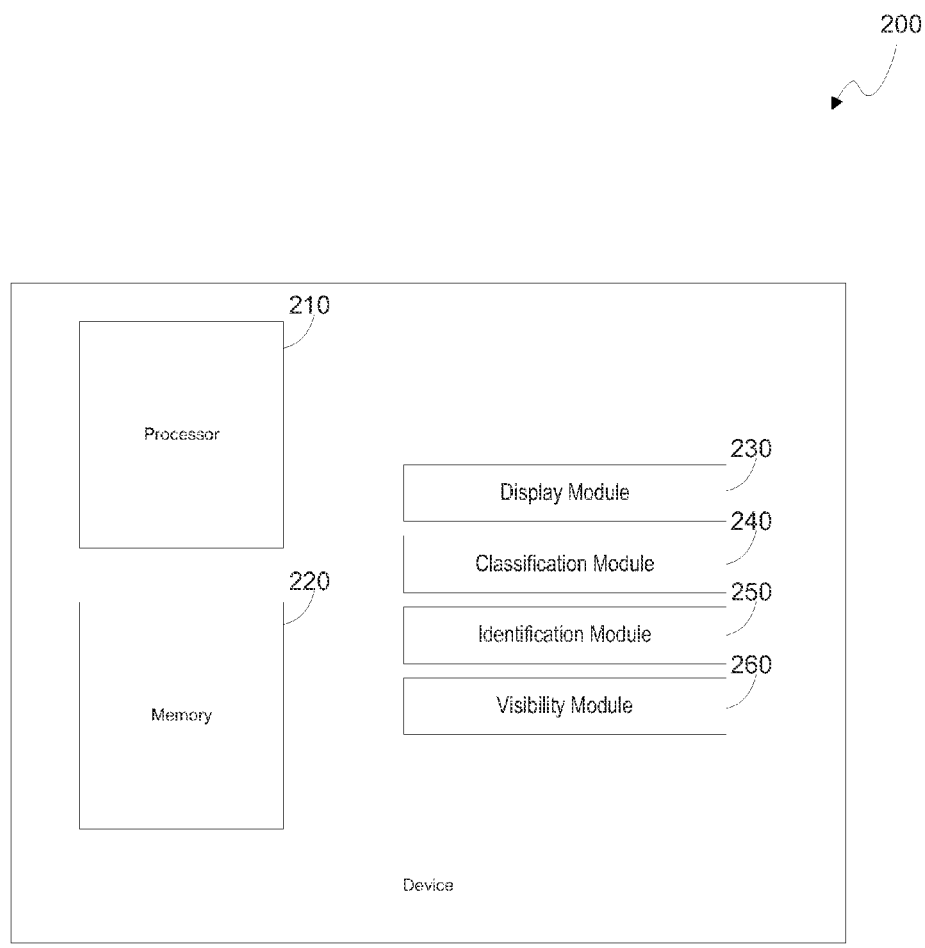
FIG. 2 is an example block diagram of a device to obstruct private user content.

FIG. 2 is an example block diagram of a device 200 to obstruct user content. The device 200 may be a notebook computer, a slate computing device, a portable reading device, a wireless device, a large interactive display, a server, a smart wall, or any other device that may be utilized to customize a multi-user user interface.

In the embodiment, the device 200 includes a processor 210, a memory 220, a display module 230, a classification module 240, an identification module 250, and a visibility module 260. The processor 210 may be a CPU, a GPU, or a microprocessor suitable for retrieval and execution of instructions from the memory 220 and/or electronic circuits configured to perform the functionality of any of the modules 230, 240, 250 and 260 described below.

Each of the modules 230, 240, 250 and 260 may include, for example, hardware devices including electronic circuitry for implementing the functionality described below. In addition or as an alternative, each module may be implemented as a series of instructions encoded on a machine-readable storage medium and executable by the processor 210. In embodiments, some of the modules 230, 240, 250 and 260 may be implemented as hardware devices, while other modules are implemented as executable instructions.

The display module 230 is to transmit private user content to a multi-user interface, such as the LID, an interactive wall presentation, interactive whiteboard presentation, etc. The display module 230 may include an input or output (not shown) to interface with the multi-user interface, such as a networking interface (e.g., Ethernet), a Universal Serial Bus (USB) connection, etc. The display module 230 may also receive instructions from the visibility module 260 or the processor 210 to obscure at least some the private user content transmitted to the multi-user interface.

The classification module 240 is to classify at least part of the information stored or generated by the first user as private user content, where the private user content is associated with the first user. As explained above, the private user content may be classified automatically according to a type of the information or when the first user is creating or modifying the information. Alternatively, the first user may manually determine which of the information to classify as the private user content. The private user content may be stored in the classification module 240, the visibility module 260 or the memory 220, and accessed or manipulated via the processor 220.

The identification module 250 is to identify a presence of the second user at the multi-user interface, such as the LID, where the second user may not be associated with the private user content. The identification module 250 may identify the presence of the second user based on the location data. The identification module 250 may receive the location data from a sensor module (not shown), as described below. The location data may be compared and/or processed by the identification module 250 to identify the first or second or user and a location of the first or second user.

For example, the location data may include image data and infrared data. The image data may be used for face recognition or to determine the orientation of the first or second user, as described above. For example, the image data collected from a camera sensor may be compared to stored image data of the first user to recognize the first user and/or differentiate the second user from the first user. Also, the infrared data collected from an infrared sensor may be used to determine the location of the first or second user in front of the multi-user interface. The stored image data may be stored, for example at the identification module 250 or the memory 220. The identification module 250 may utilize the processor 210 to store the location data and/or process the location data.

The sensor module (not shown) may collect and transmit the location data, such as that of the second user, to the identification module 250, the processor 210 or the memory 220. As described above, the location data may relate to, for example, position information, orientation information, and distance information from the reference point and/or relate to voice data, face recognition data, and the like. To collect the location data, the sensor module may access or include a camera, a proximity sensor, an audio sensor, a weight detection pad, or the like. The weight detection pad may encompass a floor area around at least part of multi-user interface, such as in front of the LID, and include pressure sensors and that are triggered by a weight of the first or second user on the one or more pressure sensors. Accordingly, the weight detection pad may determine a distance and position of the first or second user from the reference point.

The visibility module 260 is to obstruct visibility of the private user content. The visibility module 260 may obstruct the visibility of the private user content once the second user is at less than the threshold distance from the reference point. As described above, the threshold distance may vary according to one or more parameters, such as a type or text size of private user content or the location information, where the location information may be used to determine a position, current speed, orientation, or direction of movement of the second user.

The visibility module 260 may obstruct visibility of the private user content by communicating with the display module 230 or the multi-user interface to blur, remove or convert at least part of the private user content. Converting the private user content may include at least one of changing a language, orientation, size, and placement of the private user content.

FIG. 3 is an example flowchart of a method 300 for obstructing private user content. Although execution of method 300 is described below with reference to the computing device 100, other suitable components for execution of the method 300 can be utilized, such as the device 200. Additionally, the components for executing the method 300 may be spread among multiple devices (e.g., a processing device in communication with input and output devices). In certain scenarios, multiple devices acting in coordination can be considered a single device to perform the method 300. Method 300 may be implemented in the form of executable instructions stored on a machine-readable storage medium, such as storage medium 120, and/or in the form of electronic circuitry.

At block 310, the computing device 100 associates private user content displayed at a multi-user interface, such as the LID, with a first user. As explained above, information stored and/or created or modified by the first user may be classified as private user content and associated with the first user. In addition, the first user may be manually associated or disassociated with the private user content, through an input as described above.

At block 320, the computing device 100 identifies a second user who may not be associated with the private user content at a location near the multi-user interface. As noted above, the computing device 100 may store, collect or have access to the location data. Based on the location data, the computing device 100 may identify the second user as well as a position, distance, or orientation of the second user.

For example, if the first user has already been recognized as currently using the private user content, then the presence of any subsequent user may be identified as the second user. The location data, which may include voice or face recognition data, may also be used to explicitly identify the second user. For instance, the location data of the second user may be collected and compared to stored location data of the first user by the computing device 100. In one embodiment, the collected face recognition data may be compared to the stored face recognition data of the first user. If the collected and stored face recognition data does not match, the computing device 100 may identify the presence of the second user.

In addition, based on the collected position, distance, or orientation data included in the location data, the computing device 100 may determine the location of the identified second user, as explained above. The method 300 may also include collecting location information of the second user before the identifying at block 320. As explained above, sensors, such as visual, infrared, or auditory sensors, may be used to collect location data to determine the location and/or identifying characteristics of the second user.

At block 330, the computing device 100 obstructs the private user content if a distance between the location of the second user and the private user content is less than a threshold distance. The private user content may be obstructed by blurring, removing or converting the private user content, where the converting may include changing a language, orientation, size, or placement of the private user content. At block 330, the threshold distance at which to obstruct the private user content may be varied based on a formatting, content, etc. of the private user content and/or the location data, as explained above. The computing device 100 communicates with the multi-user interface in order to obstruct the user content being displayed thereto.

Figure 4A:
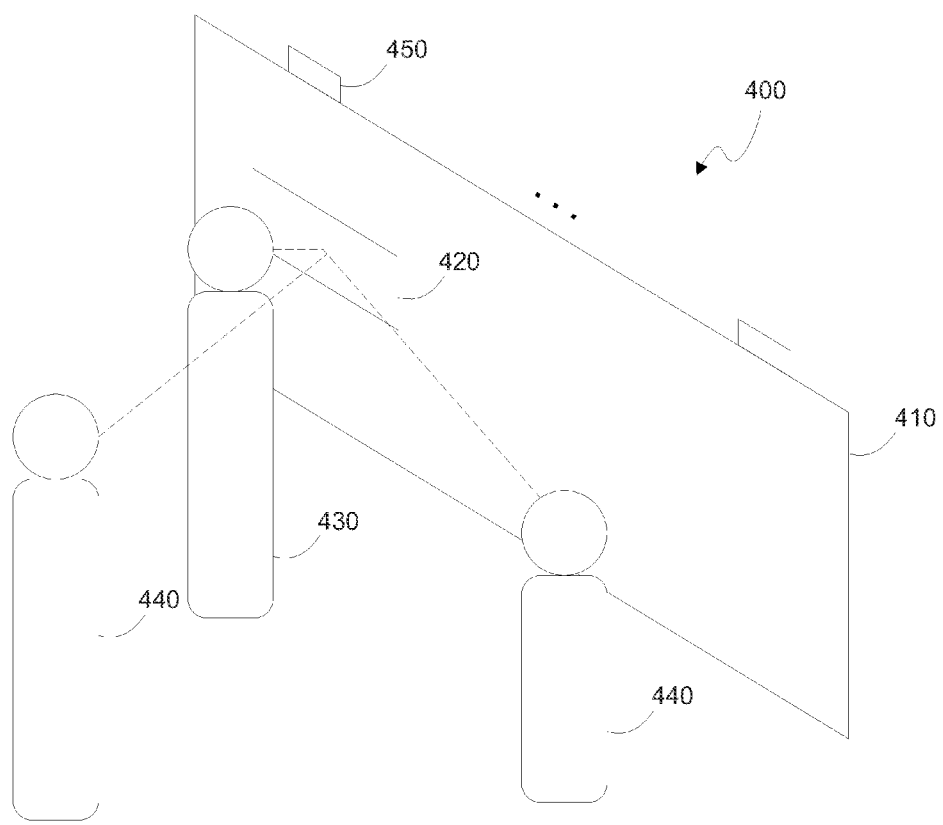
FIG. 4A is an example perspective view of a block diagram of a system for utilizing a multi-user interface.
Figure 4B:
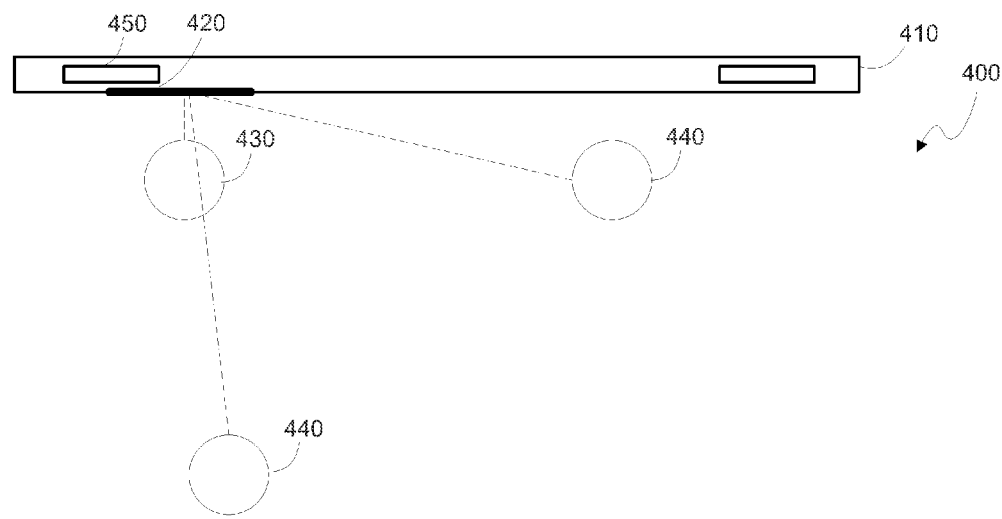
FIG. 4B is a top-down view of the block diagram of the system for utilizing the multi-user interface of FIG. 4A.
Figure 4C:
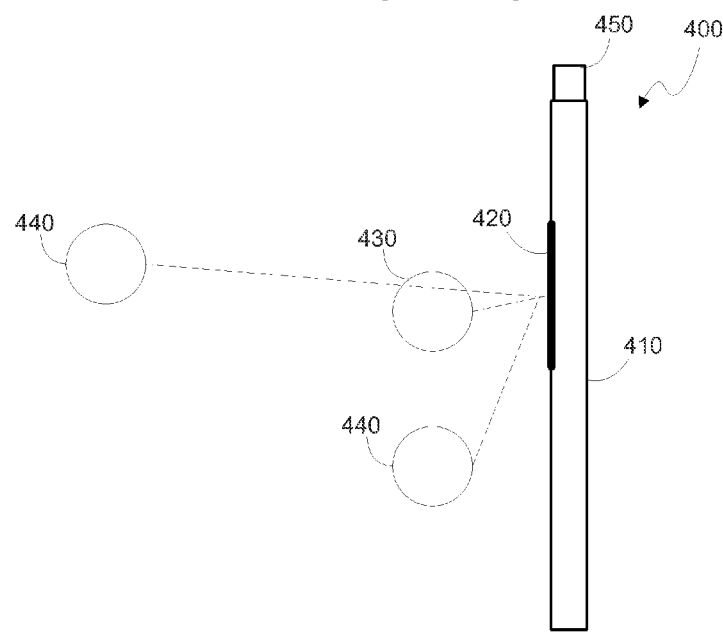
FIG. 4C is a side view of the block diagram of the system for utilizing the multi-user interface of FIG. 4A.

FIG. 4A is an example perspective view of a block diagram of a system 400 for utilizing a multi-user interface. FIG. 4B is a top-down view of the block diagram of the system 400 for utilizing the multi-user interface of FIG. 4A. FIG. 4C is a side view of the block diagram of the system 400 for utilizing the multi-user interface of FIG. 4A. In the embodiment, the system 400 includes a LID 410 that can be associated with devices to display private user content 420 to a first user 430 and to obstruct the private user content 420 based on the location data collected of the second user 440.

The location data can be gathered from sensors 450, such as camera or infrared sensors, and can be utilized to identify and determine the locations of the first user 430 and/or the one or more second users 440. Further, other information can be communicated to the large interactive display 400 to determine the positions of first or second users 430, 440. For example, audio information, such as voice recognition or noise, can also be used to identify and/or determine the locations of the first and/or second users 430, 440.

The location data gathered from sensors 450 may be used by the system 400 to determine the location of the first and/or second users 430, 440 in two- or three dimensions. For example, FIG. 4B shows that the system 400 may determine a distance of the second users 440 from the private user content 420 of the first user 430 in both a length and width direction with respect to the LID 410.

As shown in FIG. 4B, though both of the second users 440 are approximately an equal distance from the private user content 420, one of the second users 440 is further along the width direction while another of the second users 440 is further along the length direction. Also, as shown in FIG. 4C, the system 400 may also determine a distance of the second users 440 from the private user content 420 of the first user 430 in a height direction with respect to the LID 410. For example, one of the second user's 440 has a shorter height than the private user content 720 displayed on the LID 410, and so may have a more difficult viewing angle. On the other hand, the other second user 440 has a greater height than both the private user content 420 and the first user 430, and may be able to view the private user content 420 even from behind the first user 430.

The system 400 may take into account two or three dimensions in determining the distance between the second users 440 and the private user content 420. As noted above, if the distance of at least one of the second users 440 is less than the threshold distance, the system 400 may obstruct the private user content 420, such as by blurring text included in the private user content 420. Moreover, the system 400 may vary the threshold distance based on various parameters, such as a type of size of the private user content 420 or location data of the second user 440.

With the above approaches, a first user may keep certain user content displayed on a multi-user interface, such as an LID, private from a second user by automatically obstructing, such as by blurring, the user content. The user content may be obstructed when the second user is at a location less than a distance threshold. The second user may be identified and a location of the second user may be determined through location data collected from sensory inputs, such as a camera or infrared sensor. Further, the distance threshold may vary according to properties of the user content or the location data.

What is claimed is:

1. A non-transitory computer-readable storage medium storing instructions that, when executed by a processor of a device, cause the processor to:
    display private user content on an interactive display of a multi-user interface, the private user content associated with a first user;
    identify presence of a second user; and
    obstruct visibility of the private user content, wherein
    the private user content is classified according to different levels of privacy based on a type of content of the private user content, and
    the private user content having a higher level of privacy is obstructed at least one of at an earlier time as compared to user content having a lower level of privacy and at a threshold distance from the interactive display having a larger value than that of the private user content having a lower level of privacy;
    wherein the threshold distance is based on a position, current speed, and direction of movement of the second user; and
    wherein the threshold distance is further varied based on the speed and direction of movement of the second user.

2. The non-transitory computer-readable storage medium of claim 1, further comprising instructions that, when executed by the processor, cause the processor to:
    measure location data of at least one of the first and second users; and
    identify the first user according to at least one of a manual input by the first user and the measured location data of the first user, wherein
    the identify presence of the second user is based on the measured location data of the second user, and
    the second user is not associated with the private user content.

3. The non-transitory computer-readable storage medium of claim 2, wherein the location includes at least one of face recognition, voice recognition, body shape, weight, gait, hand geometry, iris recognition, and scent data of at least one of the first and second users.

4. The non-transitory computer-readable storage medium of claim 2, wherein the location data includes at least one of a position, distance and orientation of at least one of the first and second users with respect to the displayed private user content.

5. The non-transitory computer-readable storage medium of claim 2, wherein the location data of the second user is compared to the location data of the first user to differentiate the second user from the first user.

6. The non-transitory computer-readable storage medium of claim 1, wherein information is classified as the private user content based on at least one of a type of information and a command by the first user.

7. The non-transitory computer-readable storage medium of claim 1, wherein information that is at least one of modified and created by the first user when interacting with the interactive display is classified as the private user content.

8. The non-transitory computer-readable storage medium of claim 1, wherein the visibility is obstructed by at least one of blurring, removing and converting the user content, the converting including at least one of changing a language, orientation, size, and placement of the private user content.

9. A device comprising:
   a display module to transmit private user content to an interactive display of a multi-user interface;
   a classification module to classify at least one of stored and generated information as the private user content, the private user content associated with a first user;
   an identification module to identify a presence of a second user near the private user content displayed on the interactive display; and
   a visibility module to obstruct visibility of the private user content displayed on the interactive display, wherein
   the classification module is to classify the private user content according to different levels of privacy based on a type of content of the private user content, and
   the private user content having a higher level of privacy is obstructed at least one of at an earlier time as compared to user content having a lower level of privacy and at a threshold distance from the interactive display having a larger value than that of the private user content having a lower level of privacy,
   wherein the threshold distance is based on a position, current speed, and direction of movement of the second user; and
   wherein the threshold distance is further varied based on the speed and direction of movement of the second user.

10. The device of claim 9, further comprising:
    an interactive display to display the transmitted user content; and
    a sensor module including at least one of a camera sensor, a proximity sensor, an audio sensor, and a weight detection pad to collect location data associated with the second user, wherein
    the sensor module is to transmit the location information to the identification module,
    the identification module is to identify the presence of the second user near the private user content based on the location data, and
    the second user is user not associated with the private user content.

11. The device of claim 9, wherein the visibility module,
    determines the threshold distance to obstruct the user content based on a at least one of a text size of the private user content and the location information, the location information including at least one of a position, current speed and direction of movement of the second user, and
    obstructs visibility by at least one of blurring, removing and converting the user content, the converting including at least one of changing a language, orientation, size, and placement of the private user content.

12. A user detection method, comprising:
    associating private user content displayed on an interactive display of a multi-user interface with a first user;
    identifying a second user at a location near the interactive display; and
    obstructing the private user content if a distance between the location of the second user and the private user content on the interactive display is less than a threshold distance, wherein:
    the threshold distance is based on a position, current speed, and direction of movement of the second user;
    wherein the threshold distance is varied based on the speed and direction of movement of the second user;
    the private user content is classified according to different levels of privacy based on a type of content of the private user content, and
    the private user content having a higher level of privacy is obstructed at least one of at an earlier time and at the threshold distance having a larger value than that of the private user content having a lower level of privacy.

13. The method of claim 12, further comprising:
    determining a location of the second user with respect to the private user content before the obstructing, wherein
    the obstructing varies the threshold distance based on at least one of a formatting and content of the private user content, and
    the second user is not associated with the private user content.

14. The method of claim 13, wherein the obstructing includes at least one of blurring, removing and converting the private user content, the converting including at least one of changing a language, orientation, size, and placement of the private user content.

* * * * *